United States Patent Office.

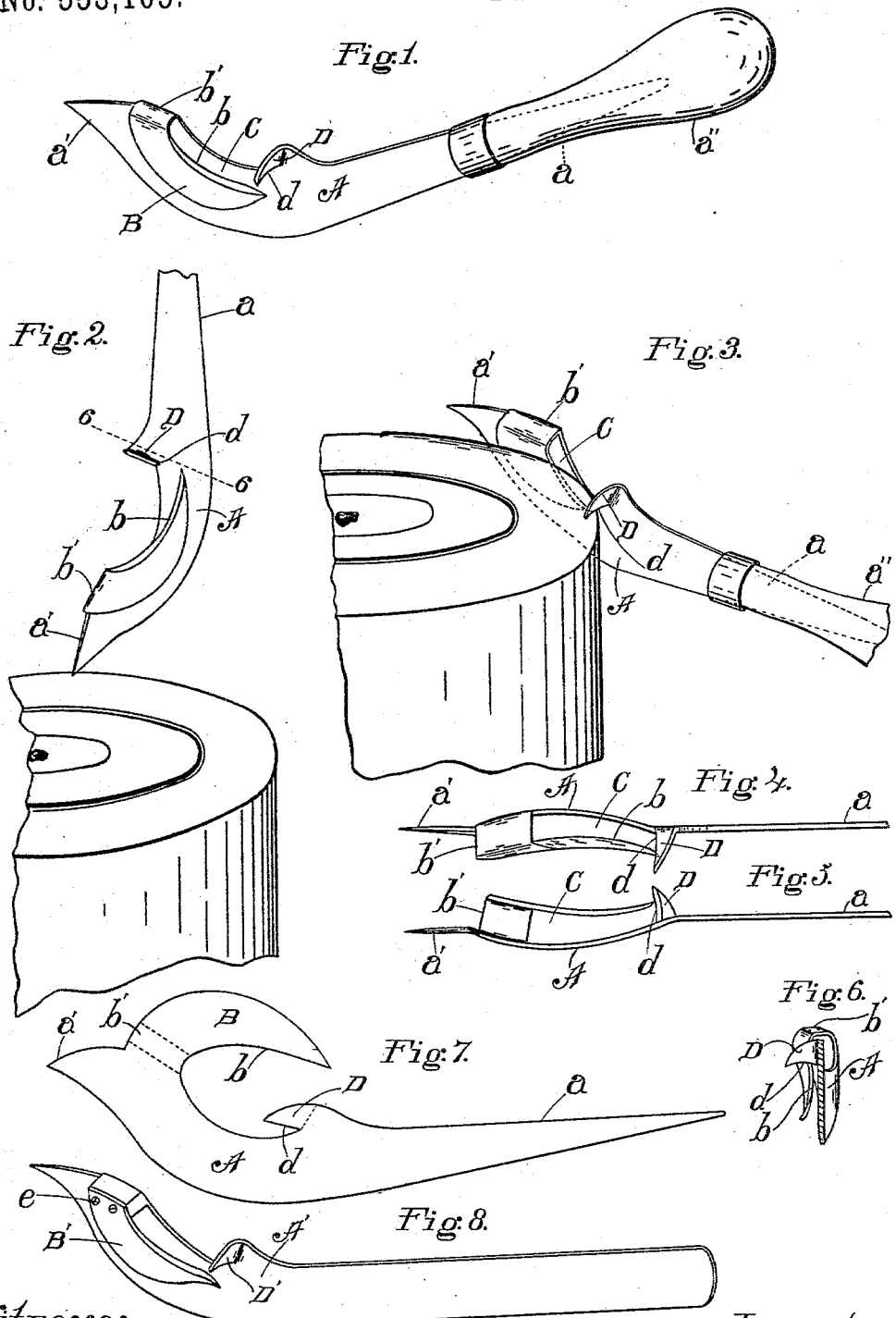

WILLIAM GARDINER COGSWELL, OF LOS ANGELES, CALIFORNIA.

CAN-OPENER.

SPECIFICATION forming part of Letters Patent No. 553,105, dated January 14, 1896.

Application filed October 28, 1895. Serial No. 567,168. (No model.)

*To all whom it may concern:*

Be it known that I, WILLIAM GARDINER COGSWELL, a citizen of the United States, residing at Los Angeles, in the county of Los Angeles and State of California, have invented new and useful Improvements in Can-Openers, of which the following is a specification.

One object of my invention is to provide a can-opener which, while being of simple and cheap construction, will make a clean circular cut in the top of the can, close to the wall, without leaving any sharp projections or ragged edge around the can, said implement being arranged to operate with a downward pressure of the hand and to cut toward the hand which is holding the implement, so that the pressure of the implement will tend to hold the can in place upon the table or other resting place and there will be no danger of any slipping of the implement and there will be no danger of cutting the hand upon the severed edges of the tin. In ordinary practical operation of my newly-invented can-opener it fulcrums in front of the cut, thus giving a solid support for the fulcrum.

Another object of my invention is to so construct the implement that when inserted in the can the operation of making the successive cuts and adjusting the implement for making such cuts will require no care upon the part of the operator; but the implement will automatically guide itself.

The accompanying drawings illustrate my invention.

Figure 1 is a perspective view of my newly-invented can-opener in its simplest and cheapest form with wooden handle. Fig. 2 is a fragmental view showing the can-opener in position for making the opening in the top of the can for the insertion of the cutting-blade. Fig. 3 shows the implement cutting the can, a fragment of which is shown. Fig. 4 is a top plan. Fig. 5 is a plan looking at the under side of the implement. Fig. 6 is a cross-sectional elevation on line 6 6, Fig. 2, looking toward the point. Fig. 7 shows the metal blank from which the shank and blade illustrated in the foregoing figures can be shaped. Fig. 8 shows a modification in which the cutting-blade is fastened to the shank by screws. In this form the shank of the implement can be made of malleable iron or other suitable metal, and be cast integral with the handle, and the point and the cutting-blade may be made of steel and both fastened to the shank by the same rivets.

My invention embraces a can-opener comprising a shank A, having a handle portion $a$ at one end, a blade B fastened to the side of the shank at the end thereof opposite the handle portion and extending toward the handle portion approximately parallel with the shank at a distance therefrom to provide a can-wall-receiving space C between the shank and the blade, and a suitable fulcrum extending laterally from the shank to support the instrument when the handle portion thereof is pried upon to force the blade to cut the can-top. The blade B (shown in the drawings) has a cutting-edge $b$ uppermost and the fulcrum D is arranged extending laterally from the shank across the extension of the can-wall-receiving space C and to a point beyond and above the point of the blade and is provided with an edge $d$, presented toward the blade to enable the fulcrum to take good hold upon the top of the can and prevent slipping when the implement is in use.

The blade is approximately parallel with the portion of the shank along which it extends, but is preferably arranged converging at its point toward such shank, so that the can-receiving space C is wider at the heel than at the point of the blade. This construction causes the point of the blade to hug against the inside of the wall of the can when the implement is in operation, thus tending to cause the blade to cut close to the wall of the can and also to hold the fulcrum from slipping off the top of the can.

The rearwardly-projecting blade B is preferably sickle-shaped, as shown, terminating in a sharp point, and the upper cutting-edge $b$ is beveled on the side opposite the shank and is curved from heel to point and preferably with an increasing radius, so that it is practically straight at the point of the blade.

The shank A and the blade B are substantially parallel, and the shank is curved from the fulcrum to the junction of the shank and blade, and the blade is correspondingly curved throughout its length, so that the can-receiving space between the blade and the shank is the arc of a circle. This space is preferably about three-sixteenths of an inch in width in the ordinary-sized implement in order to give plenty of play for cutting the tops of cans of different diameters and yet cause the implement to work in a true circle during the entire act of cutting cans of the diameters for which it is adapted, so that the cut which it makes will be free from jogs and offsets.

$a'$ indicates a penetrating-point at the end of the implement opposite the handle. With this point an opening can be made in the top of the can to receive the cutting-blade B. The bridge $b'$ which connects the blade with the shank serves the double purpose of making such connection and also providing a fulcrum for the implement when the point is inserted for making an opening into which the blade is afterward to be inserted. By means of this construction the implement is adapted to be used to cut in both directions—that is, both toward and from the hand in which the instrument is held, this being desirable in some instances—that is to say, the blade can be used to cut toward the hand holding the instrument, and the penetrating point can be used to cut in the other direction.

The form which I deem the simplest and best is that illustrated in Figs. 1 to 7. In this form the entire implement, excepting the wooden or other suitable handle $a''$, can be stamped and shaped from a single piece of sheet metal. In this way of manufacturing the blank shown in Fig. 7 will first be stamped from a sheet of metal and afterward formed by a suitable shaper and after being formed will be tempered in some suitable way to give the desired hardness.

In the form shown in Fig. 8 the shank and handle A' may all be cast in a single piece and the blade B' fastened thereto by screws or rivets $e$. The penetrating-point may be cast with the shank or fastened to it by screws or rivets.

In practical operation the operator grasps the handle of the implement and places the penetrating-point upon the top of the can at the place to be penetrated and by downward pressure the point is inserted until a hole large enough to receive the blade B has been made. Then the point is withdrawn and the point of the blade is inserted into the opening and by a backward movement of the hand the blade is brought into position with the rear of the edge of the blade against the end of the slit or opening made by the point of the instrument and with the fulcrum resting upon the top of the can above the wall thereof at a distance from the end of the slit. Then a downward movement of the hand will pry the blade upward until its edge has cut nearly to the resting place of the fulcrum. Then the hand is raised and the implement is again drawn backward and the operation is repeated until the top of the can has been entirely or sufficiently severed from the walls of the can.

The upper cutting-edge of the blade is curved abruptly at the heel and becomes straighter as it approaches the point of the blade. The purpose of this is to cause the blade to contact with the tin to be cut only at one point at any time, and the edge is always held transverse the tin to be cut, so that the pressure required to cut the tin is practically the same as that which would be required to cut the tin by means of shears.

In Fig. 7 dotted lines indicate the lines along which the blank is bent in order to form the instrument shown in the preceding views.

Now, having described my invention, what I claim as new, and desire to secure by Letters Patent, is—

1. A can opener comprising a shank having a handle portion at one end; a blade fastened to the side of the shank at the end thereof opposite the handle portion and extending toward the handle portion approximately parallel with the shank and at a distance therefrom to provide a can-wall-receiving space between the shank and blade; and a suitable fulcrum extending laterally from the shank substantially as set forth.

2. A can opener comprising a shank having a handle portion at one end; a blade having a cutting edge uppermost and fastened to the side of the shank at the end thereof opposite the handle and extending toward the handle approximately parallel with the shank and at a distance therefrom to provide a can-wall-receiving space between the blade and the shank; and a fulcrum extending laterally from the shank across the extension of the can-wall-receiving space and to a point approximately beyond and above the point of the blade, and provided with an edge presented toward the blade substantially as set forth.

3. A can opener comprising a shank having a handle portion at one end and curved from the handle portion toward the end of the shank; a blade having a curved cutting edge uppermost and fastened to the side of the shank at the end of the curved portion and extending toward the handle portion approximately parallel with the shank at a distance therefrom to provide a can-wall-receiving space between the blade and the shank; and a fulcrum extending laterally from the shank across the extension of the can-wall-receiving space and to a point approximately beyond and above the point of the blade substantially as set forth.

4. A can opener comprising a shank having a handle portion at one end and curved from the handle portion toward the end of the shank; a blade having a curved cutting edge uppermost and fastened to the side of the shank at the end of the curved portion and extending toward the handle portion approximately parallel with the shank at a distance therefrom to provide a can-wall-receiving space between the blade and the shank; and a fulcrum extending laterally from the shank across the extension of the can-wall-receiving space and to a point approximately beyond and above the point of the blade and provided with an edge presented toward the blade substantially as set forth.

5. The can opener formed of a single piece of sheet metal comprising the shank and handle portion A, a, and penetrating point a', the blade B extending toward the handle portion and bent over to extend along the side of the shank approximately parallel with the side of the shank, and the fulcrum D bent laterally to project from the side of the shank substantially as set forth.

WILLIAM GARDINER COGSWELL.

Witnesses:
JAMES R. TOWNSEND,
ALFRED I. TOWNSEND.